United States Patent
Bechmann

(10) Patent No.: US 8,694,219 B2
(45) Date of Patent: Apr. 8, 2014

(54) PROCESS OF ENDING A CLUTCH PROTECTION FUNCTION

(75) Inventor: Michael Bechmann, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1149 days.

(21) Appl. No.: 12/637,139

(22) Filed: Dec. 14, 2009

(65) Prior Publication Data
US 2010/0160114 A1    Jun. 24, 2010

(30) Foreign Application Priority Data
Dec. 18, 2008  (DE) .................. 10 2008 063 755

(51) Int. Cl.
*F16D 48/00*    (2006.01)

(52) U.S. Cl.
USPC ............... 701/67; 701/68; 477/79; 477/86; 477/166; 477/174; 477/180; 192/30 R; 192/31

(58) Field of Classification Search
USPC ........ 701/67; 477/79, 86, 166, 174, 168, 180; 192/30 R, 31, 116.5, 129
See application file for complete search history.

(56) References Cited

U.S. PATENT DOCUMENTS

| | | | | |
|---|---|---|---|---|
| 5,217,280 A * | 6/1993 | Nykerk et al. | .................... | 303/3 |
| 5,505,526 A * | 4/1996 | Michels | .......................... | 303/3 |
| 6,354,671 B1 * | 3/2002 | Feldmann et al. | ............. | 303/15 |
| 7,044,889 B2 * | 5/2006 | Habeck | ........................ | 477/175 |
| 7,079,933 B2 * | 7/2006 | Kano et al. | ....................... | 701/67 |
| 7,556,587 B2 * | 7/2009 | Jiang et al. | ...................... | 477/174 |
| 8,165,766 B2 * | 4/2012 | Muller et al. | .................... | 701/66 |
| 8,255,103 B2 * | 8/2012 | Karnjate et al. | ................. | 701/22 |
| 8,392,088 B2 * | 3/2013 | Karnjate et al. | ................. | 701/78 |
| 2003/0144114 A1 * | 7/2003 | Sayman et al. | ................ | 477/175 |
| 2006/0079377 A1 * | 4/2006 | Steen et al. | ..................... | 477/186 |

FOREIGN PATENT DOCUMENTS

EP         1616770        1/2006

* cited by examiner

*Primary Examiner* — Thomas Black
*Assistant Examiner* — Sara Lewandroski
(74) *Attorney, Agent, or Firm* — Simpson & Simpson, PLLC

(57) ABSTRACT

The invention relates to a process of ending a clutch protection function against overload of an automated clutch. The clutch protection function is ended when, by actuating the gas- and brake pedals, an absolute value of a brake pedal signal falls below a default threshold value and the time derivative of the brake pedal signal is negative.

8 Claims, 1 Drawing Sheet

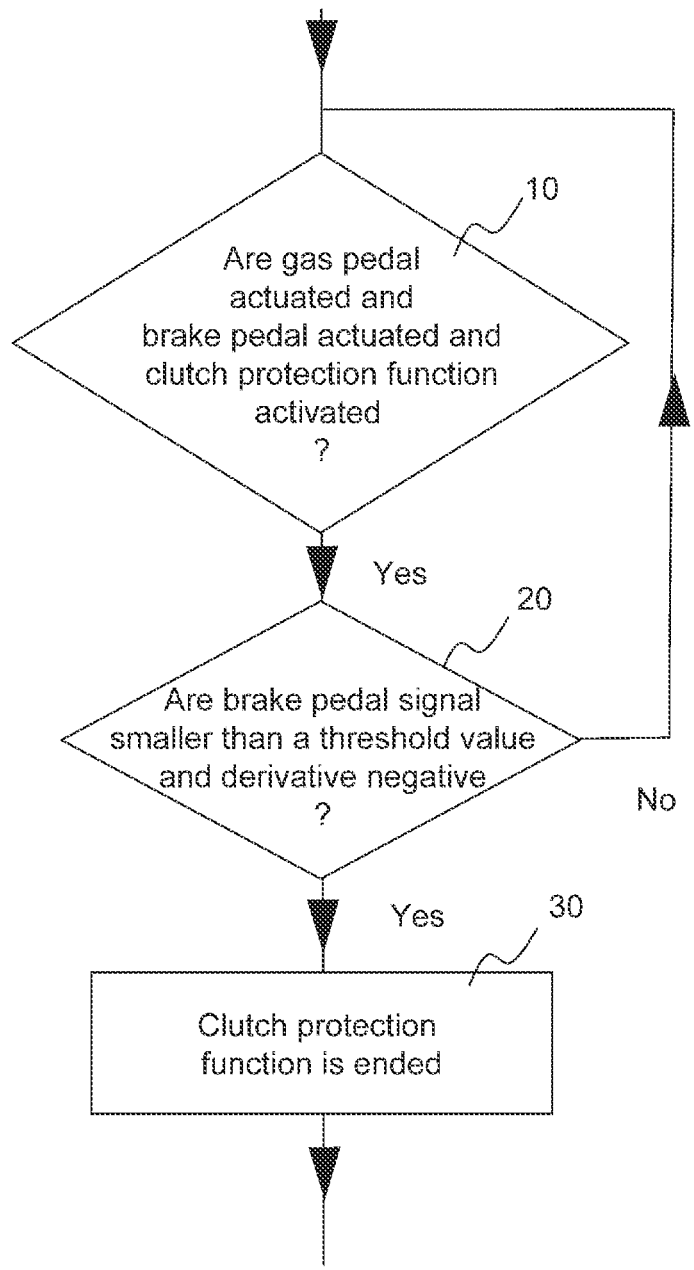

PROCESS OF ENDING A CLUTCH PROTECTION FUNCTION

FIELD OF THE INVENTION

The invention relates to a process of ending the clutch protection function against overload, with the features in accordance with the generic term of Claim 1.

BACKGROUND OF THE INVENTION

Automatically actuated clutches can find application in vehicles equipped with different transmissions. Differentiation of the transmission thereby relates not only to the degree of automation, but also to the design, so that the transmission, for instance, can involve an automated manual shift transmission, an uninterruptible manual shift transmission, a parallel shift transmission or a transmission with continuously variable change of the transmission ratio. In such transmissions, the clutch is generally executed in the form of a friction clutch.

Both when starting a vehicle and when restoring the power connection between the engine and the drive train, after a gear shift process, clutch torque is transmitted via the clutch in the event of a difference in speed between the input- and the output side of the friction clutch. In the course of this, frictional power is introduced as a product of clutch torque and the differential angular velocity between the clutch's friction surfaces, which leads to an increase in the temperature of the friction surfaces and thus of the entire clutch.

The abrasion of the clutch's friction surfaces depends on the magnitude of input energy and the temperature. Besides appropriate abrasion of the friction surfaces, secondary effects can also occur in the form of mechanical deformation of the friction surfaces and changes of the coefficient of friction of the friction surfaces, so that, for instance, in the event of a decrease of the coefficient of friction of the friction pair, an increase of the slip phase can occur and hence lead to an increase of input energy.

Therefore, particularly with dry-running clutches, it is important not to allow the energy dissipated in the clutch to be high.

For vehicles with automatically actuated clutches, direct activation of the clutch has been omitted from the driver's influence, however the driver can influence the abrasion characteristic of the clutch through his/her driving style.

For instance, it is possible that long lasting creeping motion of the vehicle moving uphill or a delayed starting process, whether noticed or unnoticed by the driver, leads to an increase in energy dissipated in the clutch. In addition, holding a vehicle at uphill by using the gas pedal leads to an increase in energy dissipated in the clutch, wherein, for instance, also forgetting to release the handbrake when starting the vehicle also increases the energy input.

Besides these causes of an increased energy dissipated in the clutch, which result from the driver's action, an increase in energy dissipated in the clutch can also result from a malfunctioning system for actuating the automated friction clutch, for instance, owing to detuning in the hydraulic line for clutch actuation, for instance, due to leakage. All these are only an example of causes of increased loading in the form of increased energy input into the friction clutch.

From this situation, EP 1 616 770 B1 discloses a process for protecting an automatically actuated clutch against overload. In particular, it describes how the drive torque of the engine is reduced when a starting process takes place against the operating brake.

The possibility that the driver can activate the gas pedal—also called accelerator—and the brake pedal concurrently, for instance, when starting the vehicle against the brake action—also called stall—entails a significant source of danger for systems with automated clutches. For a vehicle that is halted by a handbrake, in the worst case, maximum engine torque at high-slip-rotation-speeds can be transmitted by the clutch, which may quickly lead to clutch damage. Such a misuse situation can last arbitrarily long. It is therefore required indeed that the XSG-software incorporates a suitable strategy for protecting the clutch.

The protection strategy currently implemented in vehicles essentially triggers limited intervention in the engine upon detecting a situation in which the torque developed by the engine is limited to a possibly small value, so that incurred slip-power remains uncritical. The limitation of engine torque will again be relieved as soon as the brake pedal is released.

The above-described strategy has disadvantages when starting to drive uphill. When the driver holds the vehicle with the brake then accelerates and releases the brake slowly, he does not expect the vehicle to roll backwards. The protection strategy, though, prevents the development of engine torque and because of clutch torque so long as the brake is fully released. A heavily loaded vehicle on a steep hill can suddenly roll backwards. Rolling backwards on a hill is unexpected for the driver and is unpleasant because he was initially just trying to prevent it by applying the brake.

The above-described conflict between clutch protection on the one hand and the desired dynamic starting characteristic on a hill has been solved with a compromise in today's software: the applicable engine torque limit at approx. 40 Nm is set so high such that given moderate values for vehicle weight and road inclination, back rolling no longer occurs, and on the other hand, the incurred friction power of approx. 6 kW, when the gas pedal for acceleration and the brake pedal for braking are pressed, is still acceptable.

BRIEF SUMMARY OF THE INVENTION

The object of the present invention is to improve the existing clutch protection strategy such that backwards rolling when starting the vehicle on a hill can be prevented by actuating the brake pedal.

According to the invention, it is provided that the clutch protection function against overload of an automated clutch of a motor vehicle is terminated when the gas pedal and brake pedal are actuated and an absolute value of a brake pedal signal falls below a default threshold value and the time derivative of the brake pedal signal is negative.

The brake pedal signal is a continuous signal. The brake pedal signal is mathematically, functionally dependent on the intensity of the actuation of brake pedal.

Alternatively, the brake pedal signal is mathematically, functionally dependent on the brake pedal angle.

Alternatively, the brake pedal signal is proportional to the brake pressure.

Alternatively, the brake pedal signal depicts the brake torque.

A signal that denotes the brake torque is determined in that it is estimated by the brake system.

It is also proposed that, to terminate the protective measure against concurrent actuation of the accelerator and brake pedals, the absolute value of the brake pedal signal and its time derivative be evaluated. Concretely, it is proposed to terminate the measure when the brake pedal signal has fallen below a certain threshold and its derivative is concurrently negative.

In this manner, the end of the critical situation can be detected decisively earlier and the limitation of engine torque can be terminated in good time, whereas a misuse in the constellation "accelerator and brake pedal actuated simultaneously" sooner or later leads to an intervention by the clutch protection function. This, therefore, entails an improved clutch protection strategy.

Under "negative derivative of the brake pedal signal" one understands a relief of brake actuation intensity, within the scope of this document. A positive derivative of the brake pedal signal would indicate an increase of the brake actuation intensity.

Only the signal from which the derivative can be determined is therefore suitable for use as brake pedal signal.

Such a brake pedal signal, for instance, is proportional to the brake pressure or brake pedal angle, since it is a continuous signal that can be differentiated. Alternatively, brake torque that is estimated by the brake system or by the ESP or by comparable devices—for instance, based on the brake pedal angle—can be used as brake pedal signal.

Brake pedal signals available as binary discrete signals that, for instance, can only assume two states "actuated" or "not actuated" are therefore unsuitable for the present invention. If discretization of the brake pedal signal is nonetheless sufficiently fine and sufficiently time-resolved then the derivative can likewise be formed from it. Consideration of a threshold for the brake pedal signal alone is not adequate. To avoid rolling backwards, this threshold would have to be set so high that, on the other hand, the clutch is not safely protected because, below the threshold with a moderately actuated brake, high long lasting slip power can still be dissipated in the clutch. Consideration of the derivative of the brake signal is therefore a vital component of this invention. Besides preventing the backwards rolling effect on a hill, the proposed strategy can also improve the clutch protection, since the applicable engine torque limit can be lowered below the currently valid values—which lies in the range of 40 Nm in the case of passenger cars.

Automatically actuated clutches can be damaged quickly by simultaneously pressing the accelerator and brake pedals. The currently common protection strategy limits the engine torque, which can nonetheless entail undesired backwards rolling when starting to drive uphill, under certain conditions. This invention proposes detection of the end of a critical driving situation, by evaluating the derivative of the brake pedal signal. Thus, when releasing the brake, sufficient torque can be developed so that the vehicle is held on the hill and prevented from rolling backwards.

BRIEF DESCRIPTION OF THE SEVERAL VIEWS OF THE DRAWING

Further advantages and advantageous embodiments of the invention are subject of the following figures and their description.

FIG. 1 depicts the schematic view of the process sequence according to the invention. Interrogation Step 10 verifies whether the gas pedal and the brake pedal are concurrently actuated and whether the clutch protection function is activated.

DETAILED DESCRIPTION OF THE INVENTION

If this is the case, a return to the Interrogation Step 10 follows.

If this is the case, a jump to the Brake Interrogation Step 20 follows. In the process, it is verified whether the magnitude—thus the absolute value—of the brake pedal signal or of the filtered brake pedal signal is smaller than a default threshold value and simultaneously the time derivative of the brake pedal signal is negative. In this case, a negative derivative is present when the brake pedal is actuated to reduce the braking effect. The threshold value to be selected must be determined individually for the respective brake system.

If the condition in Brake Interrogation Step 20 is fulfilled, the clutch protection function will be terminated in the Final Step 30. The engine torque can then rise again as input by the gas pedal.

If the condition in Brake Interrogation Step 20 is not fulfilled, return to Interrogation Step 10 follows.

LIST OF REFERENCE SYMBOLS

10 Interrogation Step
20 Brake Interrogation Step
30 Final Step

I claim:

1. A process of ending a clutch protection function against overload of an automated clutch of a motor vehicle, comprising the steps of:
   (a) determining that an operator has activated both a brake pedal and an accelerator pedal, wherein the brake pedal generates a brake pedal signal;
   (b) calculating an absolute value of the brake pedal signal and a time derivative of the brake pedal signal, wherein the time derivative of the brake pedal signal is a change in the brake pedal signal over a period of time;
   (c) determining whether the absolute value of the brake pedal signal falls below a default threshold value and whether the time derivative of the brake pedal signal is negative, which indicates a relief of brake actuation intensity; and
   (d) ending the clutch protection function when the absolute value of the brake pedal signal falls below the default threshold value and the time derivative of the brake pedal signal is negative.

2. The process according to claim 1, wherein the brake pedal signal is continuous.

3. The process according to claim 2, wherein the brake pedal signal is mathematically, functionally dependent on the intensity of brake pedal actuation.

4. The process according to claim 2, wherein the brake pedal signal is mathematically, functionally dependent on the brake pedal angle.

5. The process according to claim 2, wherein the brake pedal signal is proportional to the brake pressure.

6. The process according to claim 2, wherein the brake pedal signal depicts the brake torque.

7. The process according to claim 6, wherein a signal depicted by the brake torque is determined by estimation in the brake system.

8. A process of ending a clutch protection function against overload of an automated clutch of a motor vehicle, comprising:
   (a) determining that an operator has activated both a brake pedal and an accelerator pedal, wherein the brake pedal generates a brake pedal signal;
   (b) while the brake pedal and accelerator pedals are activated, estimating, using a brake system, brake torque and using the brake torque as a brake pedal signal;
   (c) calculating an absolute value of the brake pedal signal and a time derivative of the brake pedal signal, wherein the time derivative of the brake pedal signal is a change in the brake pedal signal over a period of time;

(d) determining whether the absolute value of the brake pedal signal falls below a default threshold value and whether the time derivative of the brake pedal signal is negative, which indicates a relief of brake actuation intensity; and
(e) ending the clutch protection function when the absolute value of the brake pedal signal falls below the default threshold value and the time derivative of the brake pedal signal is negative.

* * * * *